(12) United States Patent
Kim (10) Patent No.: US 7,411,661 B2
(45) Date of Patent: Aug. 12, 2008

(54) LASER RADAR FOR VEHICLE USING REFLECTOR AND METHOD FOR CONTROLLING THE SAME

(75) Inventor: Cheol Ho Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/591,879

(22) Filed: Nov. 1, 2006

(65) Prior Publication Data
US 2008/0007707 A1    Jan. 10, 2008

(30) Foreign Application Priority Data
Jul. 10, 2006   (KR) .................. 10-2006-0064197

(51) Int. Cl.
  *G01C 3/08* (2006.01)
(52) U.S. Cl. .................................... 356/4.01
(58) Field of Classification Search ........ 356/4.01–4.1, 356/3.01–3.15, 5.01–5.15, 6–22
See application file for complete search history.

(56) References Cited

U.S. PATENT DOCUMENTS 6,278,194 B1 *   8/2001   Nakagawa et al. ............ 290/31

2003/0174305 A1 *   9/2003   Kasper et al. ............... 356/3.09
2004/0227926 A1 *  11/2004   Lee et al. ................... 356/4.01

FOREIGN PATENT DOCUMENTS

| JP | 61-3486 | 1/1986 |
|----|---------|--------|
| JP | 05-113481 | 5/1993 |
| JP | 07-140248 | 6/1995 |
| JP | 08-248131 | 9/1996 |
| JP | 08-261753 | 10/1996 |
| KR | 10-1997-0076166 | 3/1999 |

* cited by examiner

*Primary Examiner*—Thomas H. Tarcza
*Assistant Examiner*—Luke D Ratcliffe
(74) *Attorney, Agent, or Firm*—Peter F. Corless; Edwards Angell Palmer & Dodge LLP (57) ABSTRACT

The present invention is related to a laser radar for a vehicle using a cylindrical reflector and a method for controlling the same, and more particularly, to a laser radar for a vehicle that comprises a reflector comprising a plurality of reflection mirrors preferably with reflection accuracy of 0.5° unit.

10 Claims, 9 Drawing Sheets

<Detection range and order of the present invention>

Fig. 5

<Detection range and order of the present invention>

LASER RADAR FOR VEHICLE USING REFLECTOR AND METHOD FOR CONTROLLING THE SAME

CROSS-REFERENCE TO RELATED APPLICATIONS

This application claims priority from Korean Patent Application No. 10-2006-0064197 filed on Jul. 10, 2006 with the Korean Intellectual Property Office, the disclosure of which is incorporated herein by reference.

BACKGROUND OF INVENTION

1. Field of Invention

The present invention is related to a laser radar for a vehicle. More particularly, preferred laser radars comprise using a cylindrical reflector. In particular aspects, a laser radar for a vehicle is provided comprising using a cylindrical reflector, wherein a cylindrical reflector provided with a structure having a plurality of reflection mirrors preferably with reflection accuracy of 0.5° unit attached on an internal surface of the caliber thereof is used, hence allowing the laser scanning operation of the radar for a vehicle to be more stably accomplished and long and short distance detections to be accomplished.

2. Background

As the demand for more luxurious vehicle increases, a radar capable of detecting a distance from a vehicle ahead and its speed has been attached to a front side (bumper, grille, etc.) of the vehicle's body.

The radar for a vehicle is for the purpose of controlling a cruise and has been used in a traveling speed adaptation control, in which a distance from a vehicle ahead and its speed are detected to automatically trigger off braking or alarming in close proximity. The conventional radar and the operating method thereof will be briefly described below with reference to FIGS. 8 and 9.

Figure 8:
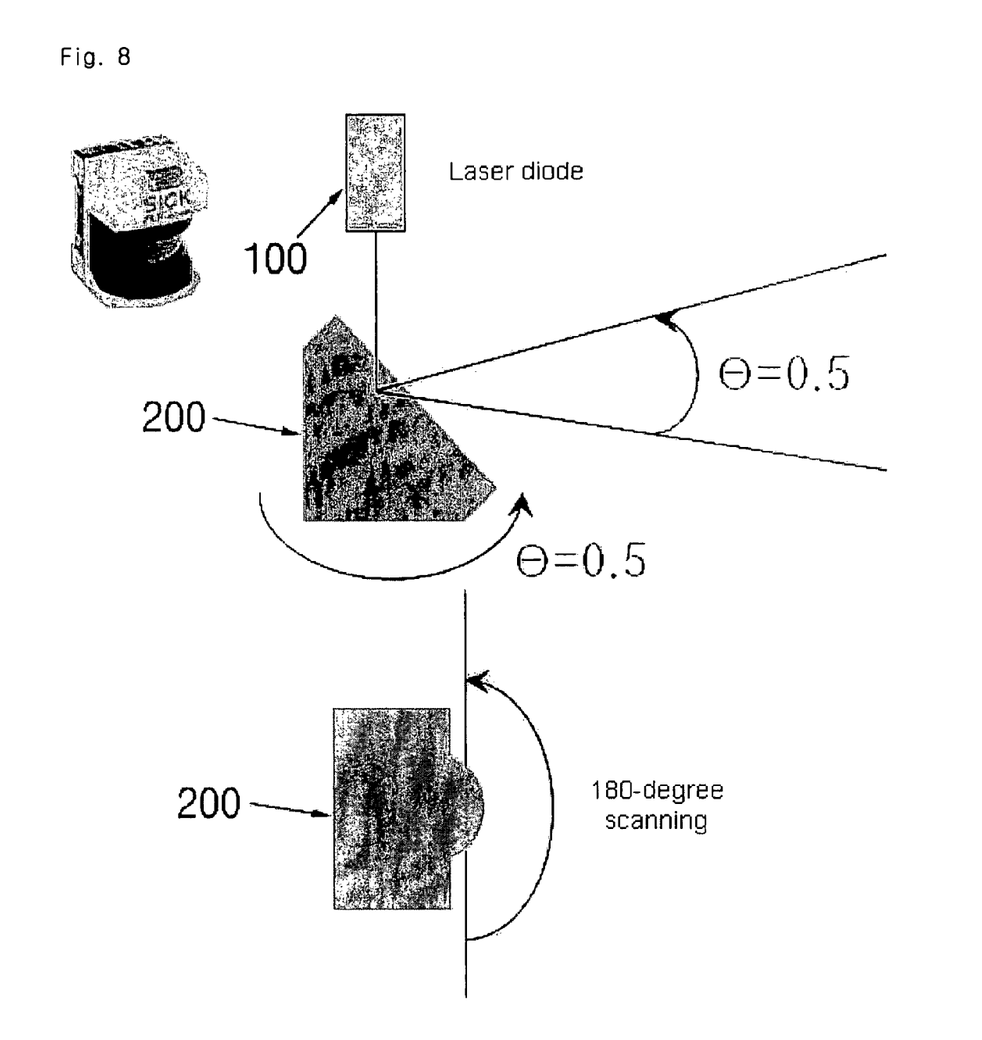
FIGS. 8 and 9 are schematic views illustrating conventional laser radar for a vehicle.

The radar shown in FIG. 8 is the industrial radar and includes a laser diode (100) and a prism (200) which is rotatable by 0.5°, as the main components, and its laser scanning method includes the steps of: generating a laser beam from the laser diode (100); transmitting the laser beam to the object to be detected while reflecting the laser beam through the prism (200); receiving a laser beam reflected from the object to be detected; measuring the time difference between the transmitted laser beam and the received laser beam; and calculating the distance from the object to be detected using the time difference.

However, there is a disadvantage in that, since the conventional radar shown in FIG. 8 uses a prism, performance can be compromised as a result of vibration of the vehicle body in traveling so that precise transmission of a laser beam is not accomplished. Moreover since the prism rotates, an additional designing is required to reduce the rotation momentum. Furthermore, since a more mechanical driver for the prism is required, it is difficult to manufacture radar itself in small size.

Figure 9:
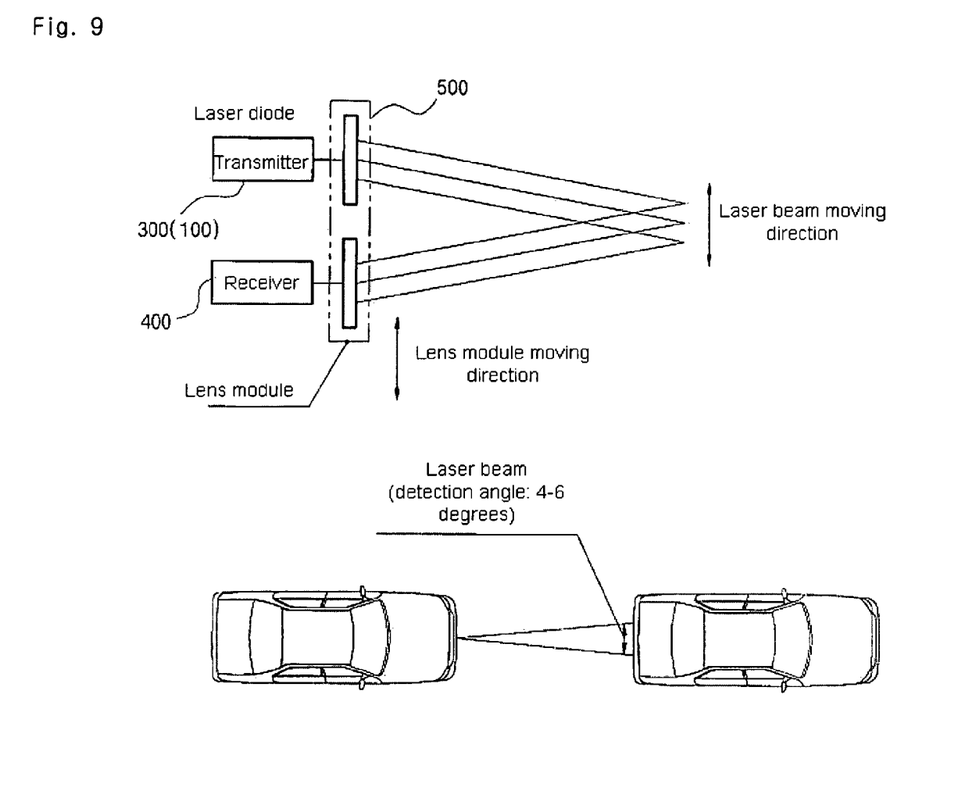

The radar shown in FIG. 9 is radar for a vehicle and includes a lens module (500) having a transmitter (300) with a laser diode (100) and a receiver (400) for receiving a laser beam, as the main components, and its laser scanning method includes the steps of: generating a laser beam from the laser diode (100) installed in the transmitter (300); radiating the laser beam through a lens of the lens module (500) to transmit it to the object to be detected; receiving the laser beam reflected from the object to be detected; measuring the time difference between the transmitted laser beam and the received laser beam; and horizontally moving the lens module (500) to measure the size of the object to be detected.

However, the disadvantage for the conventional radar shown in FIG. 9 is that it cannot detect an object at various angles using a laser, while a laser beam detection angle is very narrow at about 4 to 6°. It also has the disadvantage of the need to further install laser distance detection devices for long and short distance detections, separately, in order to perform short or long distance detection.

As the conventional radar device for a vehicle, in Korean Patent Publication No. 1999-022667 has been disclosed an optical radar device including: a light emitting means; a horizontal scanning means having a spiral form in which the apex angle of a prism is continuously changed to scan light emitting from the light emitting means; an actuator for rotating the horizontal scanning means; and a light receiving means for receiving light reflected from an object. However, the disadvantage of the aforementioned radar device for a vehicle is the imprecise laser transmission due to the application of prism that is weak to the vibration of the vehicle body.

In Japanese Patent Laid-open Publication No. Hei 8-261753 (11 Oct., 1996) has been disclosed an optical radar device for controlling a laser beam emitted from a light emitting device at an arbitrary angle through a polygonal mirror rotated by a motor with a disadvantage of narrow range for the laser transmission due to similar structure of the polygonal mirror to a prism.

In Japanese Patent Laid-open Publication No. Hei 8-248131 (27 Sep., 1996) has been disclosed a laser radar device including a radiation optical system provided with a laser beam source for emitting a laser beam, a rotation mirror for reflecting the laser beam in a scanning direction while rotating at a constant velocity, in order to change a radiation angle of the laser beam nonlinearly with respect to time. Yet, it has a disadvantage of narrow range for the laser transmission and a detection range for an object, although a radiation angle can be changed using a rotating mirror.

In Japanese Patent Laid-open Publication No. Hei 7-140248 (2 Jun., 1996) has been disclosed a laser radar device wherein a laser beam radiated from a laser beam source is rotated by a motor; radiated onto an object while passing through a mirror formed in a multi reflection type in which its top and bottom are inclined in a beam source direction; and then received to measure the distance from the object. Yet, it still has a disadvantage of narrow range for the laser transmission and a detection range for an object, although a radiation angle can be changed using a rotating mirror.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, a laser radar for a vehicle is provided using a cylindrical reflector, preferably wherein the cylindrical reflector comprises a plurality of reflection mirrors suitably with reflection accuracy of 0.5° unit attached on an internal surface of the caliber thereof.

Preferred laser radar systems of the invention can provide a more stable operation including e.g. to avoid errors that may be caused to vehicle vibration.

In a further aspect, a laser radar system is provided that comprises a plurality of reflection mirrors.

In a preferred aspect, a laser radar for a vehicle is provided using a cylindrical reflector, which may comprise: a cylindrical reflector having a cylindrical body and a plurality of reflection mirrors attached on an internal surface of the caliber of the cylindrical body along a circumferential direction thereof; a rotation driving apparatus for rotating the cylindrical reflector; a laser light receiving part positioned in a center hole of the cylindrical reflector; left/right laser light emitting parts positioned to be symmetrical to each other at a rear side position of the cylindrical reflector; a position detector for detecting a rotation angle of the cylindrical reflector; a controller for receiving signals of the laser light receiving part and the position detector; and a modulation circuit for adjusting the modulation frequency of a laser beam in accordance with a detection signal of the position detector.

In a preferred embodiment, the reflection mirrors of the cylindrical reflector are attached respectively by a unit of 0.5° on the internal surface of the caliber of the cylindrical body, along a circumferential direction thereof.

Preferably, the rotation driving apparatus or means may comprise a driven gear attached to an external face of the cylindrical body; a motor attached at a predetermined position of a vehicle body; a driving gear integrally attached to a shaft of the motor such that it is engaged with the driven gear; and a roll adhered closely to the external surface of the caliber of the cylindrical body to stabilize the effect of rolling trembling in rotation of the cylindrical body.

Preferably, the position detector may comprise a weak magnetic field magnet strip attached to the external surface of the caliber of the cylindrical body along a circumferential direction; a strong magnetic field magnet strip attached at a predetermined position of the weak magnetic field magnet strip; and a hole sensor fixedly attached to the vehicle body spaced apart from the external surface of the caliber of the cylindrical body to detect a magnetic force from the weak and strong magnetic field magnet strips.

Preferably, the controller may comprise a signal processing circuit for signal processing a laser beam received from the laser light receiving part; an A/D converter for converting a signal output from the signal processing circuit into a digital signal; a MCU for receiving a digital signal from the A/D converter to calculate the distance from the object to be detected, its speed, etc., and receiving a signal from the hole sensor of the position detector to control the modulation circuit for adjusting the modulation frequency of a laser beam.

In another aspect, a method is provided for controlling a laser radar for a vehicle using a cylindrical reflector, comprising steps of: providing a cylindrical reflector having a cylindrical body and a plurality of reflection mirrors attached to an internal surface of the caliber of the cylindrical body along a circumferential direction thereof at a predetermined position of a vehicle body; rotating the cylindrical reflector by a rotation driving apparatus; reflecting a laser beam generated from left/right laser light emitting part on the reflection mirror of the cylindrical reflector to transmit it to the object to be detected; receiving the laser beam reflected from the object to be detected through a laser light receiving part to transmit it to a controller; and signal processing the laser beam received from the controller to convert it into a digital signal and then calculating the distance from the object to be detected, its speed, etc.

Preferably, the left/right laser light emitting parts transmit a laser beam while different time with each other in order to classify detections through the left/right laser light emitting parts.

Preferably, the method may further comprises a step of transmitting a specific code together with a laser beam through the aforementioned left/right laser light emitting parts in order to classify disturbance due to a scattered laser beam when transmitting the laser beam, and distinguishing whether it is a data of corresponding channel through a comparison to the specific code.

In a preferred embodiment, the method may further comprise the steps of: detecting a rotation angle of the cylindrical reflector through a hole sensor of a position detector; transmitting a detection signal per each rotation of the cylindrical reflector to the controller; selectively controlling a modulation circuit that adjusts the modulation frequency of a laser beam in the controller in order to adjust a signal for selecting a frequency modulating a laser beam in one rotation of the cylindrical reflector, as a low frequency for a long distance followed by a high frequency for a short distance in the next rotation thereof; and adjusting a laser transmission range of the laser light emitting part as a short or long distance, in accordance with a long or short distance frequency modulating a laser beam.

In another aspect, motor vehicles are provided that comprise a described laser radar.

It is understood that the term "vehicle" or other similar term as used herein is inclusive of motor vehicles in general such as passenger automobiles, buses, trucks, various commercial vehicles, and the like.

Other aspects of the invention are discussed infra.

BRIEF DESCRIPTION OF THE DRAWINGS

The above and/or other aspects and advantages of the present invention will become apparent and more readily appreciated from the following description of the exemplary embodiments, taken in conjunction with the drawings attached hereinafter, in which.

DETAILED DESCRIPTION

As discussed above, in one aspect, a laser radar for a vehicle is provided which comprises a reflector comprising a plurality of reflection mirrors; a laser light receiving part and a laser light emitting part; a rotation driving apparatus for rotating the reflector; a position detector for detecting a rotation angle of the reflector; and preferably a controller for receiving signals of the laser light receiving part and the position detector.

In another aspect, a cylindrical laser radar for a vehicle is provided which comprises a reflector; a laser light receiving part and a laser light emitting part; a rotation driving apparatus for rotating the reflector; a position detector for detecting a rotation angle of the reflector; and preferably a controller for receiving signals of the laser light receiving part and the position detector.

Preferably, the laser light receiving part and a laser light emitting part are associated with the reflector.

Also preferably, the laser radar may further comprise a modulation circuit for adjusting the modulation frequency of a laser beam in accordance with a detection signal of the position detector.

In a further aspect, a method for controlling a laser radar for a vehicle using a reflector is provided, comprising: providing a reflector apparatus comprising a plurality of reflection mirrors; preferably rotating the reflector; reflecting a laser beam to an object to be detected; receiving the laser beam reflected from the object to be detected; and calculating the distance from the object to be detected and/or the object's speed based on information associated with the received reflected laser beam.

In a yet further aspect, a method for controlling a laser radar for a vehicle using a reflector is provided, comprising: providing a cylindrical reflector apparatus; reflecting a laser beam to an object to be detected; receiving the laser beam reflected from the object to be detected; and calculating the distance from the object to be detected and/or the object's speed based on information associated with the received reflected laser beam.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 1:
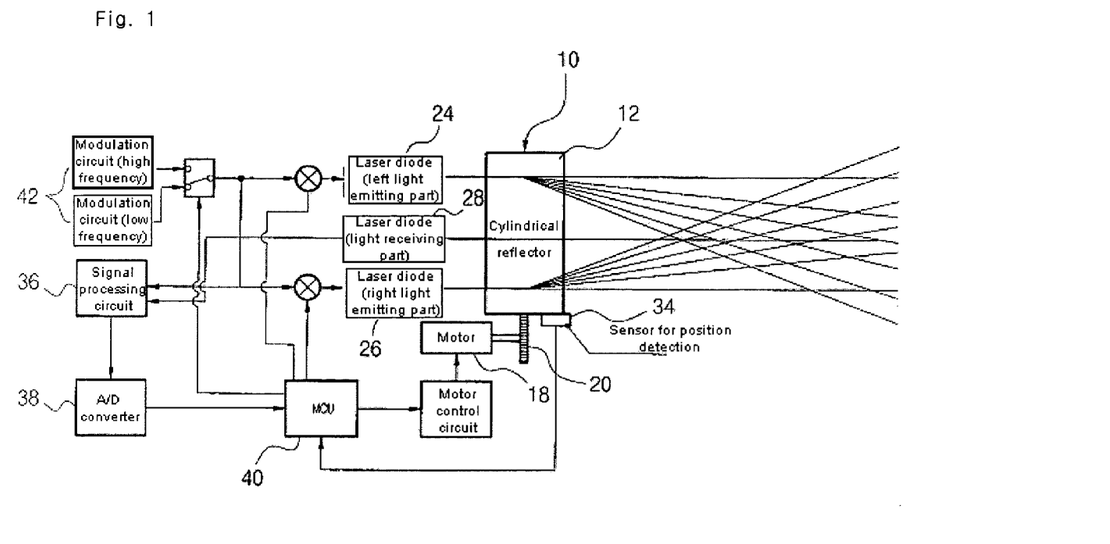
FIG. 1 is a block diagram showing a laser radar for a vehicle using a cylindrical reflector according to the present invention.
Figure 2:
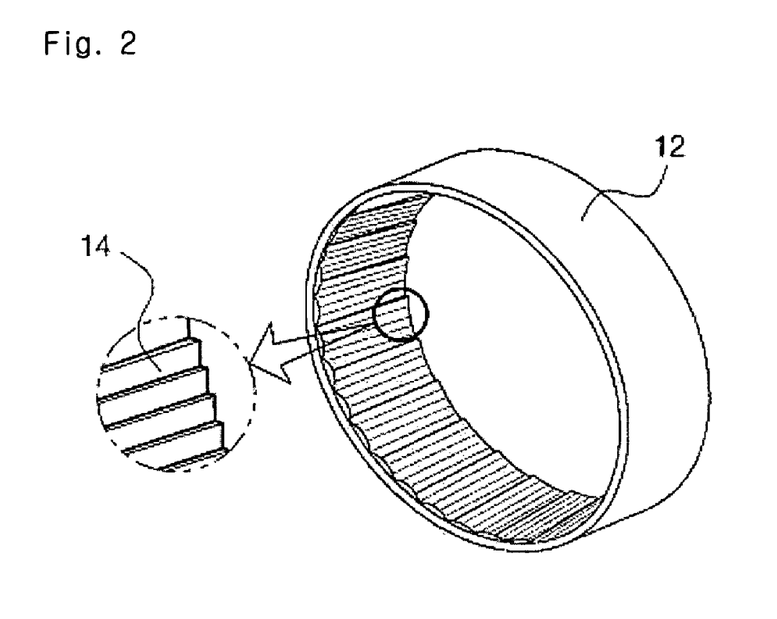
FIG. 2 is a partially sectional perspective view illustrating a structure of a cylindrical reflector according to the present invention.
Figure 3:
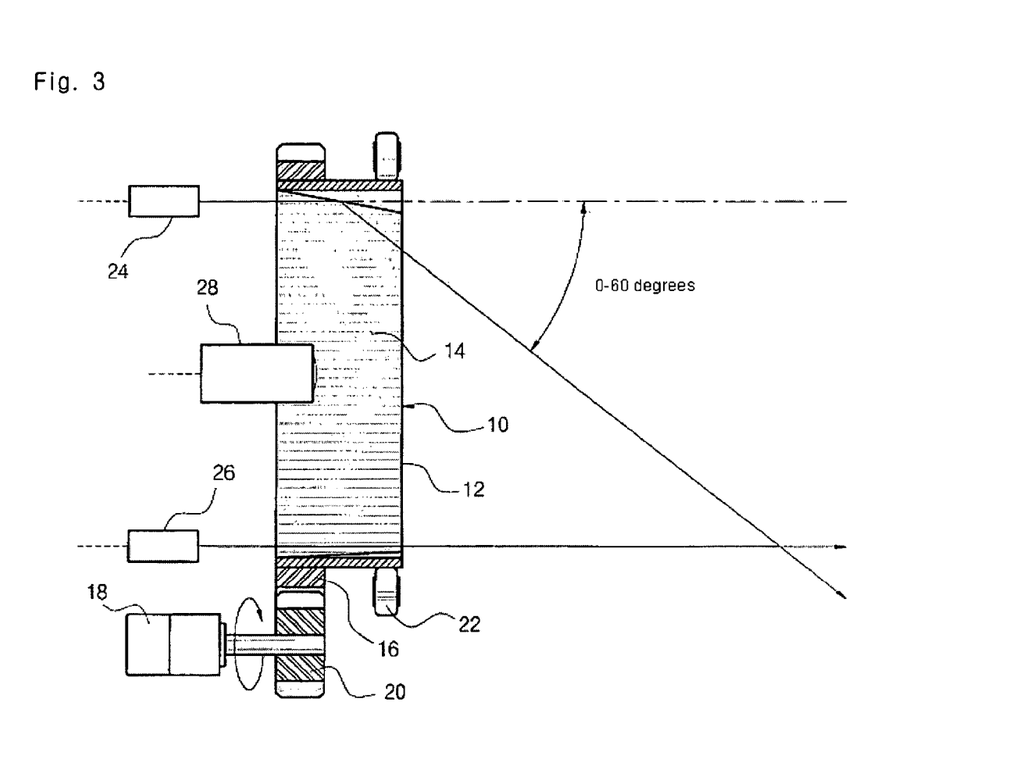
FIG. 3 is a plan view illustrating a configuration for rotation of the cylindrical reflector according to the present invention.

FIG. 1 is a block diagram showing a laser radar for a vehicle using a cylindrical reflector according to the present invention; FIG. 2 is a partially sectional perspective view illustrating a structure of a cylindrical reflector according to the present invention; and FIG. 3 is a plan view illustrating a configuration for rotation of the cylindrical reflector according to the present invention.

The present invention is related to a laser radar using a cylindrical reflector attached to a front part of a vehicle, e.g., a bumper or grille portion. The reflector can provide stable performance of the laser scanning operation of the radar for a vehicle without significant interference caused by traveling vibration of the vehicle, as well as the performance of the long and short distance detections in a shift, and a method for controlling the laser radar.

Preferably, a cylindrical reflector (10) comprises a cylindrical body (12) and a plurality of reflection mirrors (14) attached to an internal surface of the caliber of the cylindrical body (12) along a circumferential direction thereof.

More specifically, the cylindrical reflector (10) includes, preferably 120 reflection mirrors with reflection accuracy of 0.5° unit attached on an internal surface of the caliber of the cylindrical body (12) along a circumferential direction thereof so that a transmitting reflection angle of a laser beam can be varied in accordance with the rotation driving of the cylindrical body (12) to rapidly detect the object to be detected, as will be described later.

The cylindrical reflector (10) is rotated by a rotation driving apparatus and includes a driven gear (16) attached to an external surface of the caliber of the cylindrical body (12) along a circumferential direction thereof; a motor (18) attached to a predetermined position of a vehicle body so as to be driven by a motor control circuit of a controller; a driving gear (20) integrally attached to a shaft of the motor (18) and simultaneously engaged with the driven gear (16) in order to transmit torque. Moreover, the cylindrical reflector (10) further includes a roll (22) closely adhered to the external surface of the caliber of the cylindrical body (12) enabling the function of the roll (22) to support to prevent trembling when the cylindrical body (12) is rotated.

Left/right laser light emitting parts (24 and 26), and a laser light receiving part (28) are preferably positioned at a rear position of the cylindrical reflector (10), and these left/right laser light emitting parts (24 and 26) are suitably positioned at the rear position of the cylindrical reflector (10) symmetrically to each other at left and right positions thereof, while the laser light receiving part (28) is positioned at the center of the hole of the cylindrical body (12).

Figure 7:
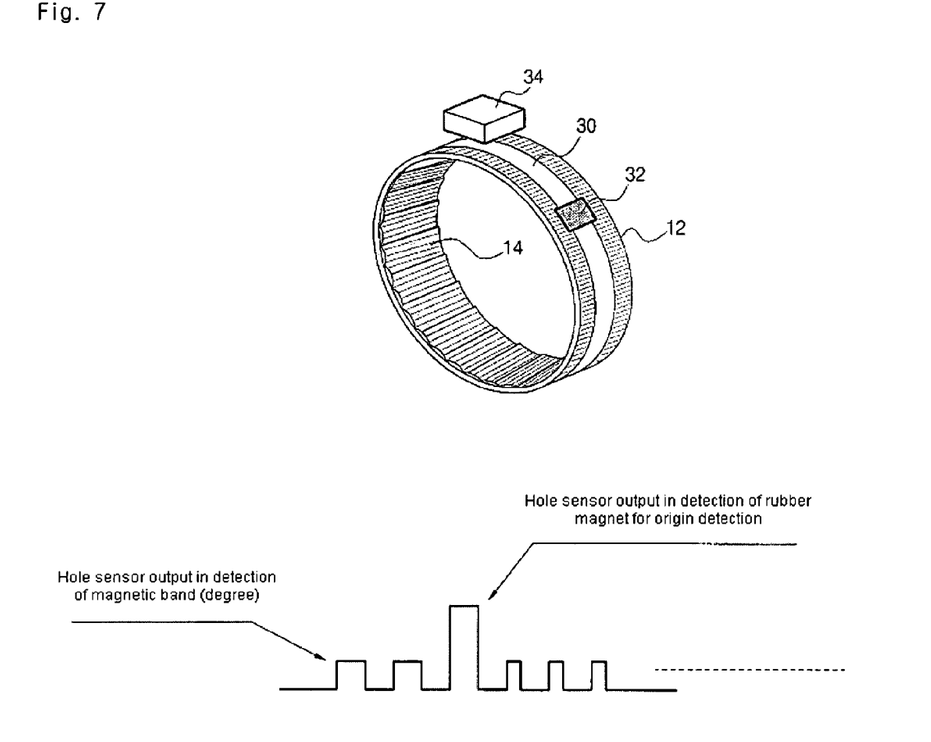
FIG. 7 is a schematic view illustrating a configuration for detecting a rotation angle of a cylindrical reflector, which is applied to the laser radar for a vehicle using the cylindrical reflector according to the present invention.

FIG. 7 of the aforementioned cylindrical reflector (10) and the position detecting part, which is attached to an adjacent location to the external surface of the caliber of the cylindrical reflector (10), and is for detecting the rotation angle thereof, will be further described hereinafter:

The position detecting part preferably comprises a weak magnetic field magnet strip (30) with a magnetic band shape that is attached to the external surface of the caliber of the cylindrical body (12) along the circumferential direction thereof; a strong magnetic field magnet strip (32) suitably attached to a predetermined position of the weak magnetic field magnet strip (30) as a point; and a hole sensor (34) suitably fixed to a vehicle body position spaced apart from the external surface of the caliber of the cylindrical body (12) for detecting the magnetic force from the magnetic strips of weak and strong magnetic field (30 and 32). As shown in a waveform diagram under FIG. 7, the output waveforms of detection signals of the magnet strips of weak and strong magnetic field (30 and 32) sensed from the hole sensor (34) have different sizes, and the waveform of the magnet strip of strong magnetic field (32), which is sensed as a point, appears bigger than that of the magnet strip of weak magnetic field (30).

Accordingly, the hole sensor (34) repeatedly senses for a signal detection from the magnet strip of strong magnetic field (32) once per every rotation of the cylindrical body (12).

The details on the laser light receiving part (28) and the controller for receiving a signal of the position detecting part to calculate the distance from the object to be detected, its speed, etc., are described hereinafter:

The controller preferably comprises a signal processing circuit (36) for processing a laser beam into a signal which is received from the laser light receiving part (28); an A/D converter (38) for converting a signal output from the signal processing circuit (36) into a digital signal; and a MicroController Unit (i.e. MCU) (40) for receiving the digital signal from the aforementioned Analog-to-Digital Converter (i.e. A/D converter) (38) to calculate the distance from the object to be detected, its speed, etc.

Furthermore, a modulation circuit (42) is suitably connected to an output side of the controller, and the aforementioned MCU (40) functions in receiving the detection signal of a rotation angle of the cylindrical reflector (10) from the hole sensor (34) of the position detecting part, then transmitting the signal for adjusting a laser modulation frequency to the modulation circuit (42).

Accordingly, the aforementioned MCU (40) suitably transmits the detection signal of a rotation angle to the modulation circuit (42) for every rotation of the cylindrical reflector (10), and the laser modulation frequency is selectively adjusted to a low frequency for a long distance or a high frequency for a short distance.

Figure 4:
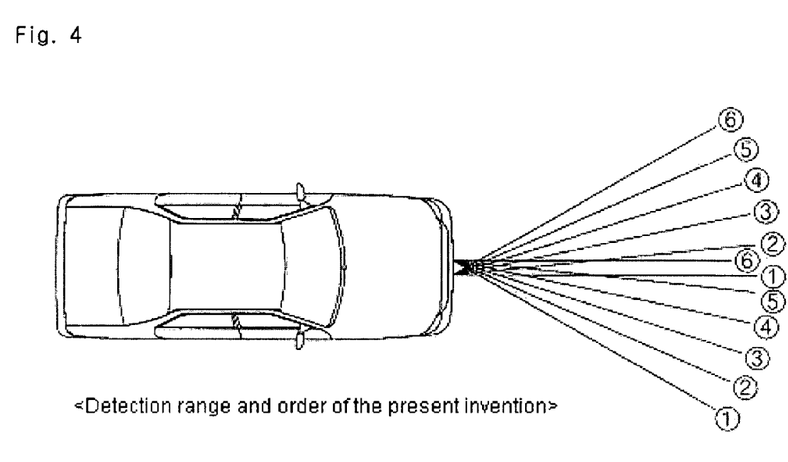
FIGS. 4 and 5 are conceptual views illustrating a laser radiation angle of the laser radar for a vehicle using a cylindrical reflector according to the present invention.
Figure 5:
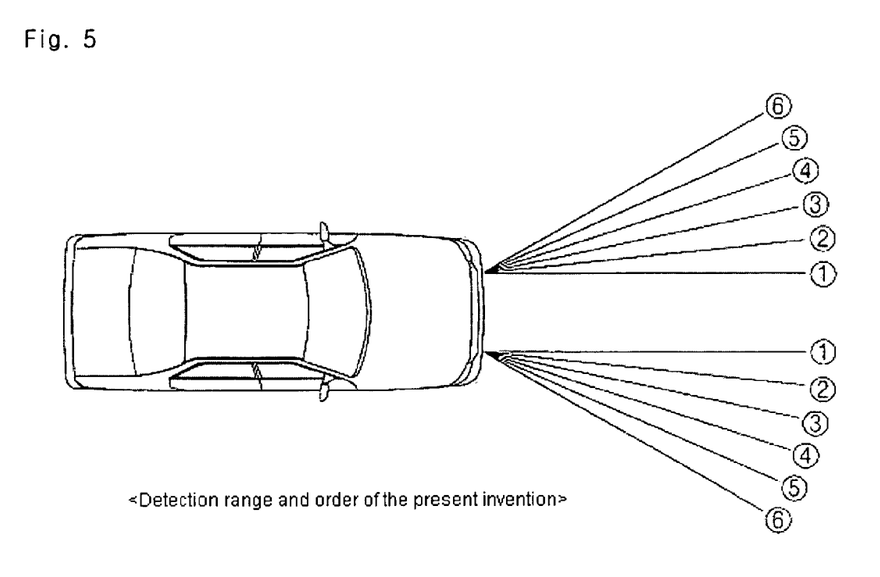
Figure 6:
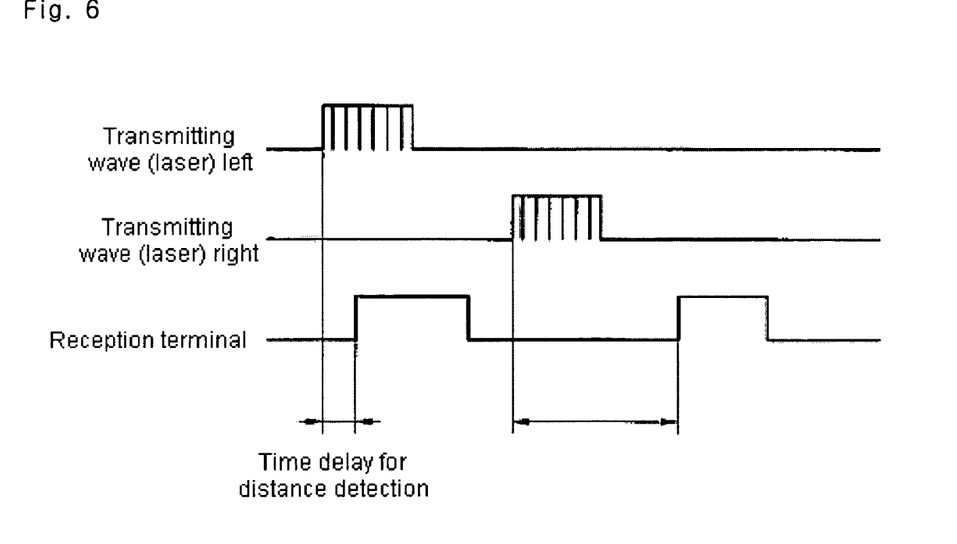
FIG. 6 is a waveform diagram illustrating an obstacle sensing/detecting logic of the laser radar for a vehicle using a cylindrical reflector according to the present invention.

The control method of the present invention for an operation of the laser radar for a vehicle using the cylindrical reflector, which is configured as described above, will be sequentially described hereinafter:

FIGS. 4 and 5 are conceptual views illustrating a laser radiation angle of the laser radar for a vehicle using a cylindrical reflector according to the present invention, and FIG. 6 is a waveform diagram illustrating an obstacle sensing/detecting logic of the laser radar for a vehicle using a cylindrical reflector according to the present invention.

The cylindrical body (12) of the cylindrical reflector (10) starts its rotating with the driving of the motor (18).

In other words, the driving gear (20) attached to the shaft of the motor (18) suitably rotates following the driving thereof; the driven gear (16) engaged with this driving gear (20) rotates; and the cylindrical body (12) having the driven gear (16) attached thereto rotates.

At this point, the roll (22) adhered to the external surface of the caliber of the cylindrical body (12), while making rolling motions, suitably functions in firmly holding the trembling or other movement of the cylindrical body (12).

Meanwhile, the rotation velocity design of the cylindrical reflector (10) may be performed as in the following:

The distance S between the laser light emitting part and the object to be detected can be expressed by a multiplication of velocity (v) and time (t) as in the following: For example, in case where the distance between the laser light emitting part and the object to be detected (the distance between vehicles) is 150 m, the return time becomes 1, since the moving velocity is $3 \times 10^8$ m/s, as shown in the following formula:

$$S = vt$$

$$150 \, m \times 2 (\text{return}) = 3 \times 10^8 \times t$$

$$t = 1.$$

The time for transmitting a laser beam is set to 10 with respect to the rotation angle of the cylindrical reflector (10), according to the present invention, and the time taken in supplying sufficient energy and detecting is set to maximum 11 in maximum. Furthermore, since the laser light receiving part (28) has two channels, time is set to 22.

Thus, the total laser transmitting time is 622 as the sum of 22.+100. (signal processing time)+500 (rotation angle by means of motor driving) and as the number of mirrors is 120, 622×120=74.6 ms is taken.

Accordingly, the rotational velocity of the cylindrical reflector (10) becomes approximately 804 rpm, when considering the number of rotation per second is 13.4 per second, and it is calculated into RPM.

Next, with the rotational driving of the cylindrical reflector (10), the laser beam produced from the left/right laser light emitting parts (24 and 26) is reflected on the reflection mirror (14) of the aforementioned cylindrical reflector (10), and is transmitted to the object to be detected.

A process of sending the laser reflected from the object to the laser light receiving part (28) for the transmission to the controller is consecutively followed.

At this point each of the left/right laser light emitting parts (24 and 26) can transmit a laser beam at a time interval, while different time with each other in order to distinguish detections from each laser light emitting part (24 and 26, respectively). In particular, the left/right laser light emitting parts (24 and 26) suitably transmits a specific code together with the laser beam in order to discriminate an obstacle from the scattered laser beam when transmitting the laser beam, and the laser light receiving part (28) suitably distinguishes whether it is the data of a corresponding channel or not, through a preparation against specific code.

Subsequently, the laser beam received from the controller is suitably processed as an analog signal in the signal processing circuit (36), and the analog signal processed from the signal processing circuit (36) is converted into a digital signal in the A/D converter (38) and then transmitted to the MCU (40).

Accordingly, the calculation of the distance from the object to be detected, its speed, etc., is performed at the aforementioned MCU (40), based on the converted digital signal, allowing automatic braking, reduction of velocity, etc., by transmitting an operational signal to a braking device when vehicles are in close distance.

The method detecting long or short distance object in a shift, through radar according to the present invention is now further described.

As the sensing of the hole sensor (34) of the position detecting part is performed consecutively with the rotational driving of the cylindrical reflector (10), the hole sensor (34) can perform the sensing for detecting magnetic force from the magnet strips of weak and strong magnetic field magnet strips (30 and 32) attached to the cylindrical body (12).

In other words, as the magnet strip of weak magnetic field (30) is adhered in a line to the external surface of the caliber of the cylindrical body (12) along the circumferential direction thereof, following the rotation of the cylindrical reflector (10) from the aforementioned hole sensor (34), the magnetic force can be detected in a length, while the magnet strip of strong magnetic field (32) detects the magnetic force instantaneously, as it is adhered in the shape of dots.

At this point, as the output of the magnet strip of weak magnetic field (30) is generated as a waveform with wide width, while the output of the magnet strip of strong magnetic field (32) is generated as a waveform with narrow width the aforementioned hole sensor (34) repeatedly senses a signal detection from the magnetic strip of strong magnetic field (32) once per every rotation of the cylindrical body (12).

Accordingly, the detection signal from the magnet strip of strong magnetic field (32) per every rotation of the cylindrical body (12) is transmitted to the MCU (40) of the controller.

Subsequently, high frequency or low frequency selection control signal is transmitted from the aforementioned MCU (40) to the modulation circuit (42) that adjusts the laser modulation frequency.

In other words, a signal, commanding a selection of the frequency that modulates the laser beam at each rotation of the cylindrical reflector (10) as a low frequency for a long distance, is transmitted to the modulation circuit (42), immediately followed by a signal to the modulation circuit (42), for a selection of a high frequency for a short distance, with the next rotation of the cylindrical reflector (10).

Accordingly, the modulation circuit (42) selects high or low frequency, in accordance with a modulation circuit control signal of the aforementioned MCU (40), hence selecting and adjusting the transmission range of the laser light emitting part to be long or short distance. Likewise, the frequency of the control signal may be altered to apply the modulation signal to a laser beam. In other words, the application range of a frequency may be adjusted and increased to allow the detection of an object at close distance, if no object is detected at far distance, while the frequency to modulate a laser beam may be adjusted to perform detection in both short and long distance.

Detection in long distance uses a band of 500 MHz while detection in short distance uses a band of 1 GHz, and the reason for adjusting the frequencies likewise is due to the difference in the distance detection resolution according to the frequencies.

As described above, according to the laser radar using the cylindrical reflector and its controlling method of the present invention, a cylindrical reflector, with a plurality of reflection mirrors with reflection accuracy of 0.5° unit attached to the internal surface of the caliber thereof, in its circumferential direction, may be used for more stable operation of the laser scanning of the radar, without detrimental influence from vibrations during operation of the vehicle.

Furthermore, with the laser transmission to short and long distance in a shift according to each rotation of the cylindrical reflector, there is an advantage of detecting the objects in both short and long and short distances.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A laser radar for a vehicle using a cylindrical reflector, comprising:
   a cylindrical reflector having a cylindrical body and a plurality of reflection mirrors wherein the plurality of reflection mirrors are attached to an internal surface of the caliber of the cylindrical body along a circumferential direction thereof so that a transmitting reflection angle of a laser beam can vary in accordance with rotation of the cylindrical body;
   a rotation driving means for rotating the cylindrical reflector;
   a laser light receiving part positioned in a center hole of the cylindrical reflector;
   left/right laser light emitting parts positioned to be symmetrical to each other at a rear side of the cylindrical reflector;
   a position detector for detecting a rotation angle of the cylindrical reflector;
   a controller for receiving signals of the laser light receiving part and the position detector; and
   a modulation circuit for adjusting the modulation frequency of a laser beam in accordance with a detection signal of the position detector.

2. The laser radar for a vehicle as claimed in claim 1, wherein the cylindrical reflector includes 120 reflection mirrors with reflection accuracy of 0.5° unit.

3. The laser radar for a vehicle as claimed in claim 1, wherein the rotation driving means comprises: a driven gear attached to an external face of the cylindrical body; a motor attached at a predetermined position of a vehicle body; a driving gear integrally attached to a shaft of the motor such that it is engaged with the driven gear; and a roll adhered closely to the external surface of the caliber of the cylindrical body to hold trembling in rotation of the cylindrical body.

4. The laser radar for a vehicle as claimed in claim 1, wherein the position detector comprises: a magnet strip of weak magnetic field attached to the external surface of the caliber of the cylindrical body along a circumferential direction; a magnet strip of strong magnetic field attached at a predetermined position of the magnet strip of weak magnetic field; and a hole sensor fixedly attached to the vehicle body spaced apart from the external surface of the caliber of the cylindrical body to detect a magnetic force from the magnetic strips of weak and strong magnetic field.

5. The laser radar for a vehicle as claimed in claim 4, wherein the controller comprises: a signal processing circuit for signal processing a laser beam received from the laser light receiving part; an A/D converter for converting a signal output from the signal processing circuit into a digital signal; and an MCU for receiving the digital signal from the A/D converter to calculate the distance from the object to be detected, its speed, etc., and receiving a signal from the hole sensor of the position detector to control the modulation circuit for adjusting the modulation frequency of a laser beam.

6. A method for controlling a laser radar for a vehicle using a cylindrical reflector, comprising the steps of:
   providing a cylindrical reflector having a cylindrical body and a plurality of reflection mirrors at a predetermined position of a vehicle body wherein the plurality of reflection mirrors are attached to an internal surface of the caliber of the cylindrical body along a circumferential direction thereof so that a transmitting reflection angle of a laser beam can vary in accordance with rotation of the cylindrical body;
   rotating the cylindrical reflector by a rotation driving means;
   reflecting a laser beam generated from left/right laser light emitting part on the reflection mirror of the cylindrical reflector to transmit it to the object to be detected;
   receiving the laser beam reflected from the object to be detected through a laser light receiving part to transmit it to a controller; and
   signal processing the laser beam received from the controller to convert it into a digital signal and then calculating the distance from the object to be detected and/or its speed.

7. The method as claimed in claim 6, wherein the left/right laser light emitting parts transmit a laser beam while dividing time so as to distinguish detections through the left/right laser light emitting parts.

8. The method as claimed in claim 6, further comprising a step of transmitting a specific code together with a laser beam through left/right laser light emitting parts so as to distinguish obstacles due to a scattered laser beam when transmitting the laser beam, and distinguishing whether it is the data of a corresponding channel through a preparation for the specific code.

9. The method as claimed in claim 6, further comprising the steps of:
   detecting a rotation angle of the cylindrical reflector through a hole sensor of a position detector;
   transmitting a detection signal per every rotation of the cylindrical reflector to the controller;
   selectively controlling a modulation circuit for adjusting the modulation frequency of a laser beam in the controller so as to adjust a signal for selecting a frequency modulating a laser beam in each rotation of the cylindrical reflector as a low frequency for a long distance or as a high frequency for a short distance in the following rotation thereof; and
   adjusting a laser transmission range of the laser light emitting part as short or long distance, in accordance with a long or short distance frequency that modulates the laser beam.

10. A motor vehicle comprising a laser radar of claim 1.

* * * * *